United States Patent [19]

Nakajima

[11] Patent Number: 4,643,424
[45] Date of Patent: Feb. 17, 1987

[54] BALL FOR BALLGAMES AND MANUFACTURING PROCESS THEREOF

[76] Inventor: Keiji Nakajima, No. 22-2, Shinkamota 1-chome, Okta-ku, Tokyo, Japan

[21] Appl. No.: 690,450

[22] Filed: Jan. 11, 1985

[30] Foreign Application Priority Data

Jan. 18, 1984 [JP] Japan ................................. 59-5744

[51] Int. Cl.$^4$ ........................ A63B 37/06; A63B 45/00
[52] U.S. Cl. .................................. 273/60 B; 273/221; 273/218; 273/DIG. 5; 273/DIG. 20; 264/239
[58] Field of Search .................... 273/199, 58 A, 58 J, 273/60 B, 63 R, 220, 221, 218, DIG. 5, DIG. 20

[56] References Cited

U.S. PATENT DOCUMENTS

| | | | |
|---|---|---|---|
| 3,118,672 | 1/1964 | Dorn | 273/58 J |
| 3,206,201 | 9/1965 | Hendricks | 273/63 R |
| 4,211,407 | 7/1980 | Tomar | 273/60 B |

FOREIGN PATENT DOCUMENTS 6021108  2/1983  Japan ................................ 273/60 B Primary Examiner—George J. Marlo
Attorney, Agent, or Firm—Sughrue, Mion, Zinn, Macpeak & Seas

[57] ABSTRACT

A plurality of granules of a hard synthetic resin and a soft synthetic resin are heated with a blowing agent to a temperature between the softening temperatures of the hard and soft resins for a predetermined time and are molded to form a ball. The resultant ball has a plurality of bubbles in the soft synthetic resin which surrounds the granules of hard synthetic resin and a suitable cover of leather or rubber is provided for the ball.

1 Claim, 4 Drawing Figures

BALL FOR BALLGAMES AND MANUFACTURING PROCESS THEREOF

BACKGROUND OF THE INVENTION

This invention relates to a ball for ballgames and a manufacturing process therefor. The ball has a reasonable hardness, high restorability, high durability, makes a clear sound when hit by a bat and is easy to manufacture.

A conventional ball for ballgames, especially for baseball, is generally comprised of a core body made of hard synthetic resin, the circumference of which is covered by a semihard cover body, on which is provided a thin layer made of relatively soft material such as thread, the circumference of which is covered by an epidermal body.

However, such a conventional ball has disadvantages in that the weight of the core body is difficult to control and a clear sound cannot be made unless the core of the ball is hit in the right spot by a fairly strong force. To overcome these disadvantages, a ball has been proposed which is comprised of a molding of hard synthetic resin with cork pieces dispersed therein and on which is wound a relatively soft thin layer such as thread, the circumference of which is covered by an epidermal body.

The ball with the cork pieces has merit since weight control can be achieved easily by the adjustment of the volume of the cork pieces and a clear sound can be made because most of the core consists of hard synthetic resin. On the other hand, the ball has the disadvantage that it has poor restorability due to the predominence of hard synthetic resin.

A ball, at the moment it is hit by a bat, is deformed to an oval shape, of which the minor axis is half the normal diameter. If the restorability is insufficient, the ball is not restored to the original condition. When the warped ball is continued in use, smooth play is prevented by such an irregular shape.

In order to remove such a disadvantage, the present inventor previously proposed a ball suitable for baseball which is molded from hard synthetic resin, a light material such as cork and soft synthetic resin, the weight of which can be easily controlled, which can produce clear sounds when hit by a bat and which possesses sufficient restorability (Japanese Utility Model Lying Open No. 60-21108). Although the functions of this ball, such as flying distance and restorability, are quite satisfactory, the following disadvantages have been noted:

(1) The cork or the like is difficult to disperse uniformily in the synthetic resins because of poor affinity.

(2) A binding agent is required in order to adhere the cork or the like to the synthetic resins for the same reason.

(3) Cracks are liable to be produced at the interface of the cork and the synthetic resins because the hardnesses therebetween differ from each other.

(4) The weight of the ball is liable to be increased when water permeates the ball since cork is hygroscopic.

SUMMARY OF THE INVENTION

An object of the present invention is to provide a ball for ball games having the most desirable properties without any of the aforementioned drawbacks.

Another object of the present invention is to provide a ball for ballgames which is easy to manufacture.

Accordingly, the present invention is directed to a ball for ballgames which comprises a spherical body having a cover body provided on the circumference thereof with the spherical body being composed of a plurality of granules of hard synthetic resins and a soft synthetic resin having a plurality of bubbles, which fills the space between the granules of hard synthetic resin.

Also provided in accordance with the present invention is a manufacturing process for a ball for ballgames which comprises heating granules of a hard synthetic resin, a soft synthetic resin and a blowing agent in the temperature range between the softening points of the hard synthetic resin and the soft synthetic resin to produce bubbles in the soft synthetic resin by the blowing agent, and molding the mixture to form a spherical body and providing a cover body on the outer circumference thereof.

DETAILED DESCRIPTION OF THE INVENTION

The synthetic resins employed according to the present invention need not be limited as long as the softening point of the hard synthetic resin is at least 10° C. higher than that of the soft synthetic resin. For example, ethylene-methacrylic acid copolymer, flourine-containing polyhydrocarbon and the like can be employed as the hard synthetic resin. Ethylene-vinyl acetate copolymer, soft polyethylene and the like can be employed as the soft synthetic resin. Each of the synthetic resins can be employed singly, but more than two kinds of the hard synthetic or the soft synthetic resins may be employed. For example, ethylene-methacrylic acid copolymer and fluorine-containing polyhydrocarbon may be employed jointly as the hard synthetic resins. The mixing ratio therebeteween is adjusted so that the hard synthetic resin proportion is between 20–90 percent and preferably between 60–70 percent. If the proportion thereof is over 90 percent, the function of the soft synthetic resin would be diminished, for example, to reduce the restorability of the ball. If, on the other hand, the proportion thereof is less than 20 percent, the function of the hard synthetic resin would be diminished such that, for example, a clear sound could not be produced when hit by a bat.

The hard synthetic resins contained in the resulting ball should be granular so that they are uniformly dispersed in the ball. If the hard synthetic resins are not dispersed uniformly, the equilibrium of the ball will be off-center so that an abnormal flight, an abnormal bounce and the like may take place.

The blowing agent employed in this invention may be an inorganic one, such as ammonium carbonate, sodium hydrogen carbonate and the like, or an organic one, such as azobissisobutyronitril, amyl acetate, diazoaminobenzene and the like.

The heating point of this invention should be between the softening points of the hard synthetic resin and the soft synthetic resin. If the mixture of the two resins and the blowing agent is heated over the softening point of the hard synthetic resin, the hard synthetic resin is softened and bubbles would also be produced in the hard synthetic resin. The resulting ball, in which hard synthetic resins are softened and have the bubbles, cannot make clear sounds when hit by a bat. The heating temperature depends on the kind of synthetic resins employed. If softening temperatures of employed synthetic resins are, for example, 200° C. and 120° C., respectively, the heating temperature may be between 130°–150° C. The heating time can be selected in the range between one minute to one hour, with five minutes to ten minutes being preferable.

Figure 1:
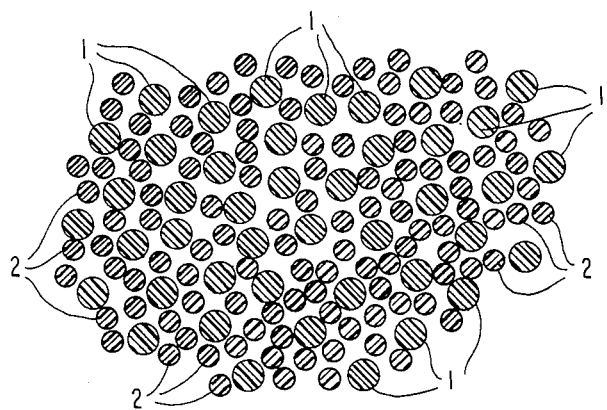
FIG. 1 is a sectional view of the granules before heating.
Figure 2:
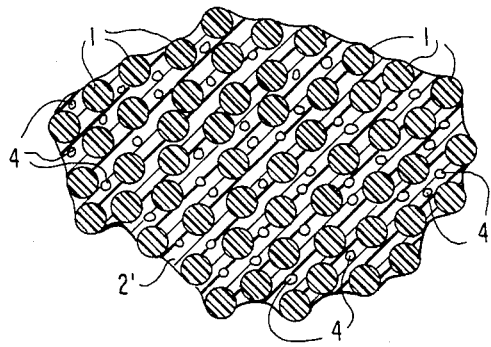
FIG. 2 is a sectional view of the granules after heating.
Figure 3:
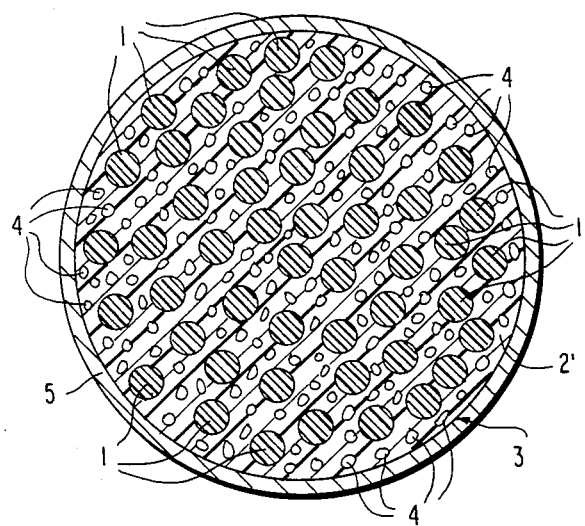
FIG. 3 is a sectional view of a molded ball provided with a cover body.

Referring now to FIGS. 1 to 3, the manufacturing process of the ball will be explained. After a plurality of hard synthetic resin granules 1 and a plurality of soft synthetic resin granules 2 are dispersed almost uniformly, a blowing agent is added (FIG. 1). Then, the soft synthetic resin granules are softened to the melted state and gas is generated from the blowing agent. The generated gas is dissolved in the soft synthetic resin. If the volume of the generated gas is large, part of the gas exists in the soft synthetic resin as bubbles even before cooling. As shown in FIG. 3 the bubbles are dispersed substantially uniformly throughout the soft synthetic resin.

The synthetic resins 1, 2, of FIG. 2 are molded in a mold to form a spherical body 3. The spherical body 3 in the mold is then cooled so that bubbles 4 are produced in the soft synthetic resin 2. A cover body 5 is then provided on the spherical body 3. Generally, leather or rubber is employed as the cover body. The spherical body may have a thread wrapped about the outer surface thereof prior to being covered by leather or rubber. However, it is preferable to employ no thread because thread is liable to absorb water or the like.

Figure 4:
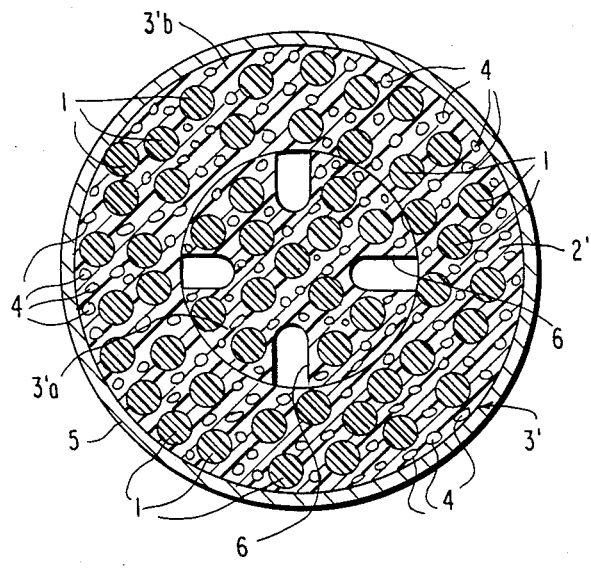
FIG. 4 is a sectional view of a ball according to a modification of the present invention.

Another preferred embodiment of the present invention is illustrated in FIG. 4. A spherical body 3' is divided into two parts to provide a spherical body 3'a having recesses 6 on the outer surface thereof, and a hollow body 3'b having a hollow portion adjacent the outer surface of the spherical body 3'a. A cover body 5 is provided on the spherical body 3'.

The ball according to the present invention is mainly used as a training ball for baseball, but can be used for other ball games such as golf.

Since the spherical body of the ball according to the present invention is comprised of a hard synthetic resin and a soft synthetic resin having bubbles therein and employs no cork, the ball is difficult to split and is not liable to weight changes due to the permeation of water or the like.

Further, when the ball is manufactured, the manufacturing process is advantageously simplified because the dispersion of the cork is not required and a bonding agent is not necessary.

The following Example illustrates the present invention but should not be construed to limit the invention.

EXAMPLE

Granules (75 g) of Highmilan (Registered Trademark of Mitsui Poly Chemical Kabushiki Kaisha), a copolymer of ethylenemethacrylic acid, and granules (45 g) of ethylene-vinyl acetate, and azobisisobutyronitril were heated at 140° C. for ten minutes under stirring. After heating, the mixture was molded in a spherical mold to form a spherical body upon cooling. The spherical body thus obtained was covered by an oxhide to be a ball for baseball.

This ball and a conventional ball containing cork pieces were used as training balls by Japanese professional baseball players for two months. Then each of the two kinds of balls were cut in half. No cleavage or the like could be found in the ball according to the present invention. On the other hand, some cleavage was observed around the cork pieces in the conventional ball. The ball according to the present invention was superior in restorability and made clearer sounds.

What is claimed is:

1. A ball for ball games comprising a spherical body and a cover body provided on the circumference thereof, the spherical body of which consists essentially of a plurality of granules of hard synthetic resin and a soft synthetic resin of which the softening point is at least 10° C. lower than that of the hard synthetic resin having a plurality of bubbles disposed substantially uniformly in the space between the hard synthetic resin granules.

* * * * *